United States Patent [19]

Torizawa et al.

[11] Patent Number: 5,428,556
[45] Date of Patent: Jun. 27, 1995

[54] APPARATUS FOR PREDICTING TOOL LIFE

[75] Inventors: Yoshio Torizawa, Oguchi; Shinji Shimizu, Tokyo; Masayuki Okabe, Atsugi, all of Japan

[73] Assignee: Okuma Corporation, Nagoya, Japan

[21] Appl. No.: 319,055

[22] Filed: Oct. 6, 1994

Related U.S. Application Data

[63] Continuation of Ser. No. 66,429, Feb. 25, 1993, abandoned.

[30] Foreign Application Priority Data

May 27, 1992 [JP] Japan .................. 4-135118

[51] Int. Cl.$^6$ .............................................. B21K 5/12
[52] U.S. Cl. .................. 364/551.02; 340/679; 340/680; 395/575; 73/808; 73/810; 73/821
[58] Field of Search ........... 364/551.02, 474.2, 474.21, 364/474.17; 395/575; 340/679, 680; 73/808, 810, 821

[56] References Cited

U.S. PATENT DOCUMENTS

| | | | |
|---|---|---|---|
| 4,245,316 | 1/1981 | Koikawa et al. | 364/474.17 |
| 4,628,458 | 12/1986 | Ohta et al. | 364/474.17 |
| 5,008,842 | 4/1991 | Nagai et al. | 364/551.02 |
| 5,115,403 | 5/1992 | Yoneda et al. | 364/551.02 |
| 5,187,773 | 2/1993 | Hamilton et al. | 364/551.02 |
| 5,197,018 | 3/1993 | Oh | 364/474.17 |
| 5,212,645 | 5/1993 | Wildes et al. | 364/551.02 |

Primary Examiner—Ellis B. Ramirez
Assistant Examiner—Thomas Peeso
Attorney, Agent, or Firm—Oliff & Berridge

[57] ABSTRACT

There is provided an apparatus for predicting a tool life which reports a tool life ratio to an operator or a control device, when a remarkable change of work load values is detected. In a predicted life setting section 122, there is set a percentage of a quantity worked until the detection of the noticeable change of the work load values based on the workable quantity until the breakage of the tool which is regarded as 100%. A predicted residual work quantity calculating section 123 calculates a residual tool life value converted into a parameter at a point of time when an alarm is input from a work load monitoring section 121, on the basis of data of a work quantity accumulating section 120 and the predicted life setting section 122. A predicted residual work quantity outputting section 124 reports the residual tool life value to an operator or a control device. In consequence, when the remarkable change of the work load values has been detected, a ratio of the residual work quantity to the tool life can be reported to the operator or the control device.

7 Claims, 8 Drawing Sheets

| TOOL No. | ACCUMULATED WORK QUANTITY | WORK QUANTITY AT ALARM GENERATION | FORESEEN RESIDUAL WORK QUANTITY |
|---|---|---|---|
| | DISPLAY OF FORESEEN TOOL LIFE | | |
| 1 | 83 | 81 | 7 |
| 2 | 35 | * | * |
| 3 | 21 | * | * |
| 4 | 75 | * | * |
| 5 | 15 | * | * |
| 6 | 33 | * | * |
| 7 | 105 | 102 | 8 |

| DRILL No. | NUMBER OF FORMED HOLES |
|---|---|
| DRILL 1 | 97 |
| DRILL 2 | 101 |
| DRILL 3 | 55 |

Fig. 9 PRIOR ART

APPARATUS FOR PREDICTING TOOL LIFE

This is a continuation of application Ser. No. 08/066,429 filed May 25, 1993, now abandoned.

BACKGROUND OF THE INVENTION (i) Field of the Invention

The present invention relates to an apparatus for predicting the life of a tool which detects work load values of a machine tool and indicates a tool life, when a remarkable change of the work load values is observed.

(ii) Description of the Prior Art

Figure 9:
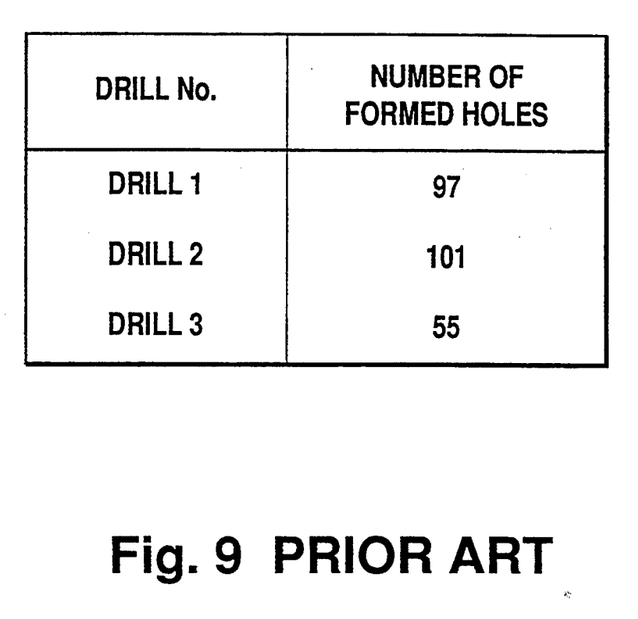
FIG. 9 shows numbers of holes formed by drills having one lot number until the drills become broken.

Heretofore, a tool life has been predicted by the use of a working term or the number of working times as a parameter representing the tool life on the basis of the experience of an operator. That is, a predetermined working term or a predetermined number of working times has been regarded as the tool life. FIG. 9 shows numbers of holes formed by some drills having one lot number until the drills have been broken. As is apparent from FIG. 9, even drills having the same lot number have different tool lives, and therefore it is difficult to predict the tool life.

According to another method, increase in the work load values before the breakage of the tool is detected, and the tool is then stopped by an alarm output of a work load monitor by which the above-mentioned increase in the work load values has been detected. Afterward, the condition of the tool is estimated by an operator to decide the timing of the tool exchange. Also in this case, however, the tool life depends upon the experience of the operator, and so the tool has often been broken. This is for the following reason: when the alarm is first output, it cannot be foreseen how long working can be continued until the tool is broken, and eventually the tool is utilized to its limit.

Figure 7:
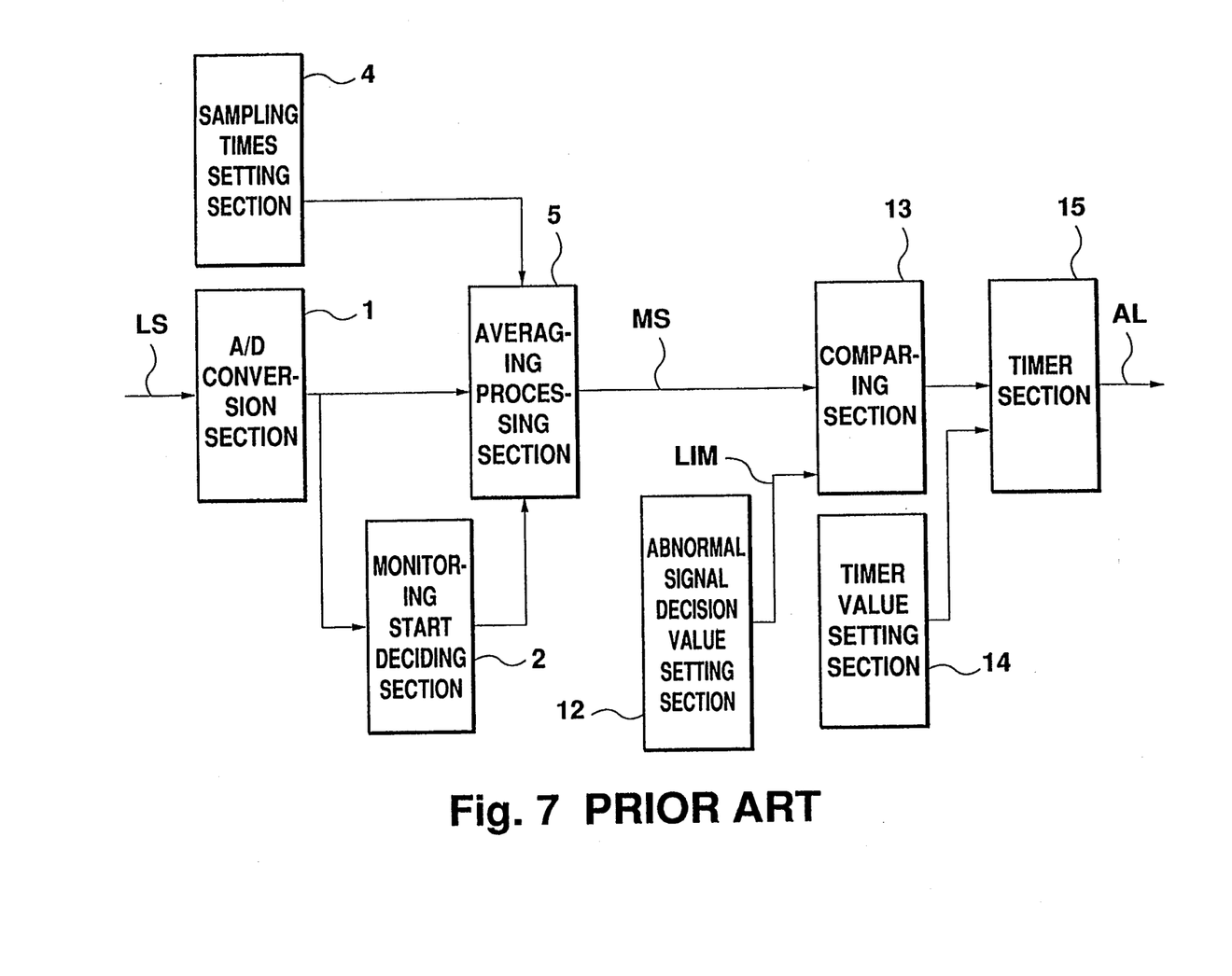
FIG. 7 is a block diagram illustrating the constitution of a conventional work load monitor.
Figure 8A:
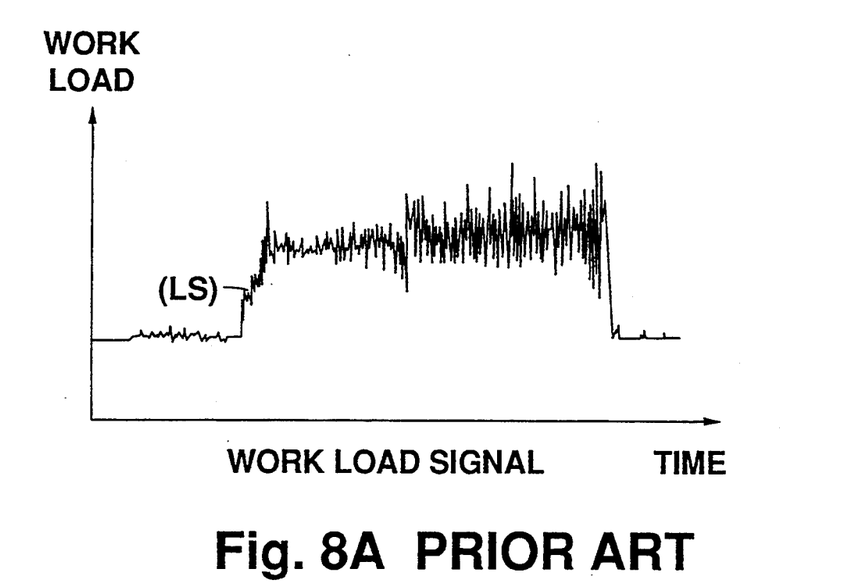
FIG. 8A shows work load values which are input to the conventional work load monitor.
Figure 8B:
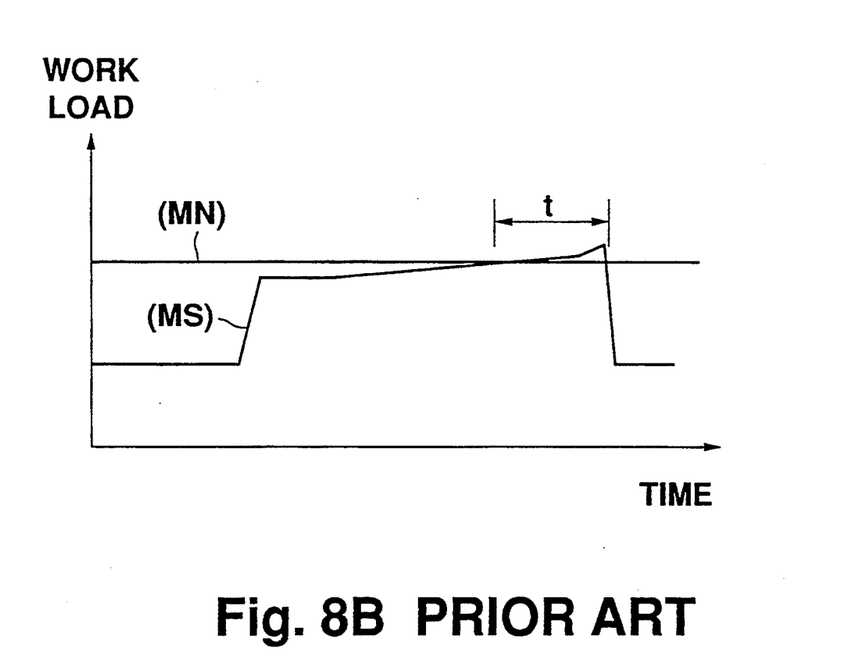
FIG. 8B is an illustrative view of the processing of the conventional work load monitor.

FIG. 7 is a block diagram illustrating the constitution of a conventional work load monitor, and FIGS. 8A and 8B show its signal processing method. The work load monitor has an A/D conversion section 1 in which the work load values (LS, see FIG. 8A) detected and then output in the form of signals in the machine tool are converted into digital data at a constant sampling period. The A/D conversion section 1 is connected to an averaging processing section 5 and a monitoring start deciding section 2. In the averaging processing section 5, data of the work load values of a number set in a sampling times setting section 4 are averaged. Furthermore, the monitoring start deciding section 2 outputs a monitoring start signal to the averaging processing section 5, when the work load values have reached a predetermined level.

The averaging processing section 5 outputs the obtained mean value as a mean signal (MS). The averaging processing section 5 is connected to a comparing section 13. This comparing section 13 compares the mean signal (MS) with an abnormal signal decision value (LIM) set by an abnormal signal decision value setting section 12 (see FIG. 8B), and it outputs an abnormal signal, when the data of the averaged work load values are in excess of the abnormal signal decision value (LIM).

To the comparing section 13, a timer section 15 is connected. This timer section 15 outputs an alarm (AL) in order to report that the work load values have remarkably changed, when a period (t, see FIG. 8B) during which the abnormal signals are continuously input is in excess of a period set by a timer value setting section 14.

Next, operation will be described. The work load values (LS) detected In the machine tool are converted into the digital data at a constant sampling period in the A/D converting section 1 and then averaged in the averaging processing section 5. This averaging can be achieved by calculating a mean value of the data of the work load values of the member set in a sampling times setting section 4. When this mean value signal (MS) is fed to the comparing section 13, the mean value signal (MS) is compared, in the comparing section 13, with the abnormal signal decision value (LIM) set by the abnormal signal decision value setting section 12. If it is judged as a result of this comparison that the data of the averaged work load values are in excess of the abnormal signal decision value (LIM), the comparing section 13 outputs an abnormal signal to the timer section 15. When a period (t) during which the abnormal signals are continuously input into the timer section 15 is in excess of a period set by the timer value setting section 14, the timer section 15 judges that the work load values have remarkably changed, and it outputs an alarm (AL).

The conventional work load monitor is constituted as described above, and so only the remarkable change of the work load values is reported to an operator. Therefore, the experience of the operator is necessary for the foresight of the tool life, and skill is required. That is, there has been the problem that an unskilled operator cannot predict tool exchange timing.

SUMMARY OF THE INVENTION

An object of the present invention is to provide an apparatus for predicting a tool life which can report the tool life to an operator, when the remarkable change of work load values is detected.

The apparatus for predicting a tool life regarding the present invention is an apparatus for predicting a tool life having the following constituent requirements. That is, the apparatus for predicting a tool life is comprised of:

(a) a work quantity accumulating section for accumulating a parameter which represents the tool life, (b) a work load monitoring section for detecting the remarkable change of work load values, (c) a predicted life setting section for setting a normalized value of a life ratio of the tool at a point of time when the remarkable change of the work load values appears, (d) a predicted residual work quantity calculating section for calculating a residual tool life as a parameter value on the basis of data of the work quantity accumulating section and data of the predicted life setting section, when the remarkable change of the work load values is detected by the work load monitoring section, and (e) a predicted residual work quantity outputting section for reporting the residual tool life on the basis of the parameter value calculated by the predicted residual work quantity calculating section.

Therefore, in the apparatus for predicting a tool life of the present invention, the parameter which represents the tool life is accumulated by the work quantity accumulating section, and the remarkable change of the work load values is then detected by the work load monitoring section. A normalized value of a life ratio of the tool at a point of time when the remarkable change of the work load values appears is set by the predicted life setting section, and a residual tool life is calculated as the parameter value by the predicted residual work quantity calculating section on the basis of data of the work quantity accumulating section and data of the predicted life setting section, when the remarkable change of the work load values is detected by the work load monitoring section. Then, the residual tool life is reported by the predicted residual work quantity outputting section on the basis of this parameter value. Therefore, tool exchange timing can be precisely predicted.

Furthermore, a work load monitor regarding the present invention is a work load monitor having the following constituent requirements. That is, the work load monitor is comprised of:

(a) a memory section for memorizing necessary number of work load values of a tool from a point of time when the work load values have been designated as digital data, (b) an averaging processing section for calculating a mean value of the data memorized in the memory section, and a band width setting section for setting an allowable width of fluctuation of the work load values from the mean value, (c) an abnormal signal detecting section for judging whether or not a difference between the mean value and the data of the memory section is within the allowable width set by the band width setting section, and then outputting abnormal signals when the difference is in excess of the allowable width, and a counter section for counting the number of abnormal signals, (d) a normalizing section for calculating a ratio at which the number of the counted abnormal signals occupies the data number of the memory section, and a comparing section for outputting an alarm so as to report a remarkable change of the work load values, when the output value of the normalizing section is larger than a set value.

Furthermore, in the work load monitor of the present invention, the necessary work load values alone are memorized from the designated point of time by the memory section. From the data memorized by the memory section, a mean value of the work load values is calculated by the averaging processing section. On the other hand, the allowable width of the fluctuation from the mean value of the work load values is set by the band width setting section. The abnormal signal detecting section judges whether or not a difference between the mean value of the work load values and the data memorized in the memory section is within the allowable width set by the band width setting section, and then outputs the abnormal signals, when the difference is in excess of the allowable width. The number of abnormal signals output from the abnormal signal detecting section is counted by the counter section, and a ratio at which the number of the counted abnormal signals occupies the data number of the memory section is calculated by the normalizing section. On the basis of this ratio, presence or absence of the remarkable change of the work load values is judged, and when it has been judged that the remarkable change of the work load values occurs, an alarm is output.

DESCRIPTION OF THE PREFERRED EMBODIMENT

Figure 1:
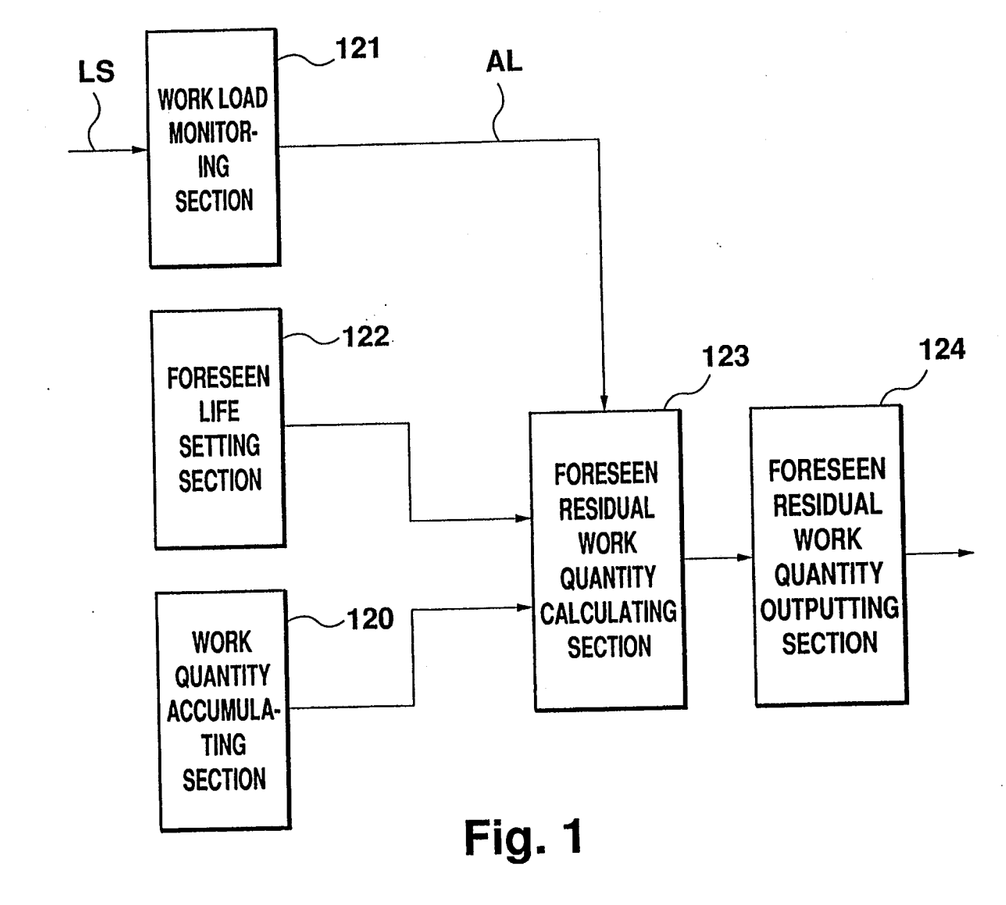
FIG. 1 is a block diagram illustrating the constitution of one embodiment of an apparatus for predicting a tool life of the present invention.

FIG. 1 is a block diagram illustrating the constitution of one embodiment of an apparatus for predicting a tool life of the present invention. This apparatus for predicting the tool life is composed of a work quantity accumulating section 120 for accumulating a parameter which represents the tool life, a work load monitoring section 121 for detecting a remarkable change of work load values, and a predicted life setting section 122 for setting a normalized tool life, i.e., a life ratio of the tool which represents a time when the remarkable change of the work load values appears. The work quantity accumulating section 120, the work load monitoring section 121 and the predicted life setting section 122 are connected to a predicted residual work quantity calculating section 123. This predicted residual work quantity calculating section 123 calculates the tool life as the above-mentioned parameter value on the basis of data of the work quantity accumulating section 120 and data of the predicted life setting section 122, when the remarkable change of the work load values has been detected by the work load monitoring section 121.

The predicted residual work quantity calculating section 123 is connected to a predicted residual work quantity outputting section 124.

This predicted residual work quantity outputting section 124 reports a ratio of the residual work quantity to the tool life on the basis of the parameter value calculated by the predicted residual work quantity calculating section 123.

Figure 2:
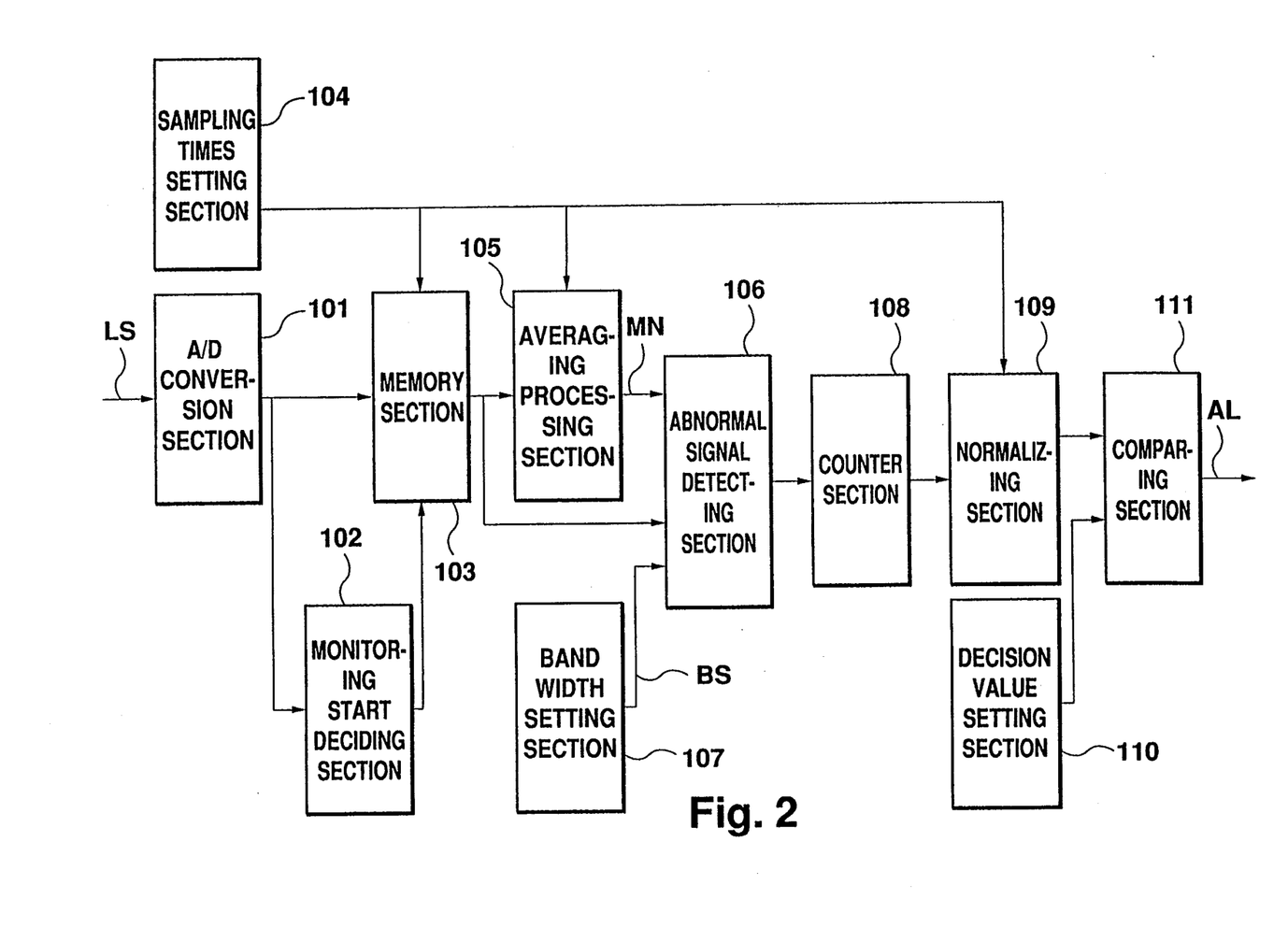
FIG. 2 is a block diagram illustrating the constitution of a work load monitoring section which can be used in the apparatus for predicting the tool life of the present invention.
Figure 3A:
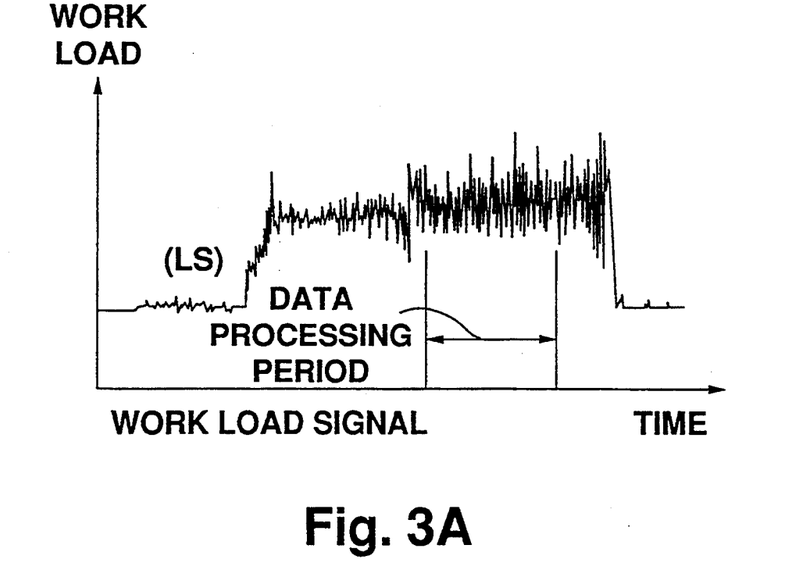
FIG. 3A shows a work load signal which is input to the work load monitoring section.
Figure 3B:
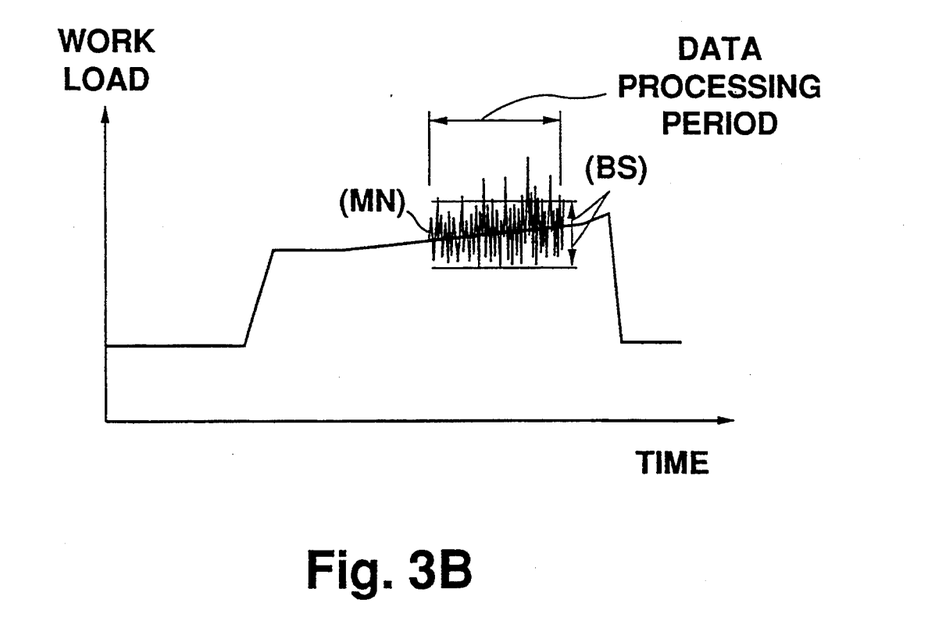
FIG. 3B is an illustrative view of the processing of a work load monitor in the embodiment.

FIG. 2 is a block diagram illustrating the constitution of the work load monitoring section 121 regarding the present invention, and FIGS. 3A and 3B show a processing method of a signal which is input to the work load monitoring section 121. This work load monitoring section 121 has an A/D conversion section 101 in which work loads (LS, see FIG. 3A) detected in the machine tool are converted into digital data at a constant sampling period, and the A/D conversion section 101 is connected to a memory section 103 and a monitoring start deciding section 102. As in a conventional embodiment, when a monitoring start signal is output from the monitoring start deciding section 102, the memory section 103 memorizes as many sampling data items as are set by a sampling times setting section 104. The memory section 103 is connected to an averaging processing section 105. This averaging processing section 105 calculates a mean value (MN, see FIG. 3B) of the data items memorized by the memory section 103, the number of data items being set by the sampling times setting section 104.

The averaging processing section 105 is connected to an abnormal signal detecting section 106. This abnormal signal detecting section 106 calculates a difference between the mean value (MN) obtained by the averaging processing section 105 and each of the work load values memorized by the memory section 3, and then externally outputs a signal indicating that abnormal signals have been detected, when this difference is in excess of a band width (BS, see FIG. 3B) set by a band width setting section 7.

Furthermore, the abnormal signal detecting section 106 is connected to a counter section 108 for counting the number of times that the signal indicating that the abnormal signals have been detected is output. The counter section 108 is connected to a normalizing section 109. This normalizing section 109 calculates a percentage of the value counted by the counter section 108 based on the number of the data set by the sampling times setting section 104 which is regarded as 100%. Furthermore, the normalizing section 109 is connected to a comparing section 111. This comparing section 111 compares a value previously set in a decision value setting section 110 with a normalized counter value obtained in the normalizing section 109 and then outputs an alarm (AL) so as to report a remarkable change of the work load values, when the normalized counter value obtained in the normalizing section 109 is larger than the value set in the decision value setting section 110.

Next, the operation of the present embodiment will be described. The work load monitoring section 121 monitors the work load signal (LS) from the machine tool and then outputs the alarm (AL), when the noticeable change of the work load values has been detected. Furthermore, in the work quantity accumulating section 120, there is memorized an accumulated value of the parameter values representing a tool life until now. In the predicted life setting section 122, there is set a percentage of a workable quantity until the detection of the noticeable change of the work load values based on the fact that the workable quantity until the breakage of the tool is regarded as 100%. In the predicted residual work quantity calculating section 123, there is obtained a normalized tool life at a point of time when the alarm (AL) is input from the work load monitoring section 121, on the basis of the data set in the predicted life setting section 122. Next, on the basis of the normalized tool life and the data output from the work quantity accumulating section 120, the tool life value is converted into the parameter representing the tool life, and it is then output. Afterward, the predicted residual work quantity outputting section 124 reports the tool life value output from the predicted residual work quantity calculating section 123 to an operator or a control device.

Next, the operation of the work load monitoring section 121 will be described. The work load values (LS) detected in the machine tool are converted into digital data in the A/D conversion section 101, and then fed to the monitoring start deciding section 102 and the memory section 103. Furthermore, the monitoring start deciding section 102 outputs a monitoring start signal to the memory section 103, when the work load values have reached a predetermined level signal. In the memory section 103, there are successively memorized as many data items as the number set in the sampling times setting section 104 in compliance with the monitoring start signal from the monitoring start deciding section 102. That is, sampling data during a data processing period shown in FIG. 3A are memorized by the memory section 103. A mean value of the data memorized in the memory section 103 is calculated in the averaging processing section 105. As described above, this mean value can be obtained by calculating the mean value (MN) of as many data items as the number set in the sampling times setting section 104. In the abnormal signal detecting section 106, there can be calculated a difference between the mean value (MN) obtained in the averaging processing section 105 and each work load value memorized in the memory section 103. If this difference is In excess of a band width (BS) previously set by the band width setting section 107, an abnormality detected output signal is output to the counter section 108, and in this counter section 108, the number of times that the abnormality detected output signal is output is counted. The normalizing section 109 calculates a percentage of the counted value based on the number set by the sampling times setting section 104 which is regarded as 100%. In a comparing section 111, the value previously set by the decision value setting section 110 is compared with the counter value normalized by the normalizing section 109, and if the normalized counter value is larger than the value set by the decision value setting section 110, it is judged that the remarkable change of the work load values occurs and an alarm (AL) is then output.

Figure 4:
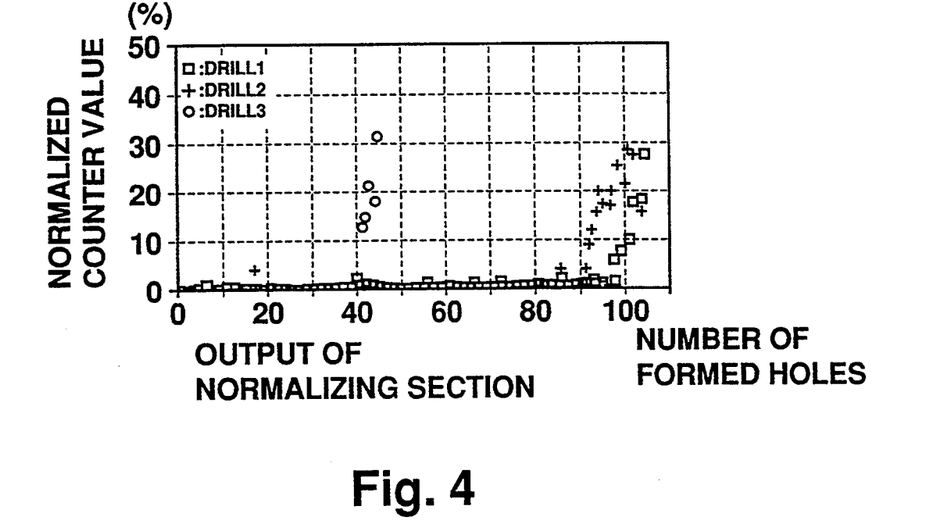
FIG. 4 shows the output of a normalizing section.
Figure 5:
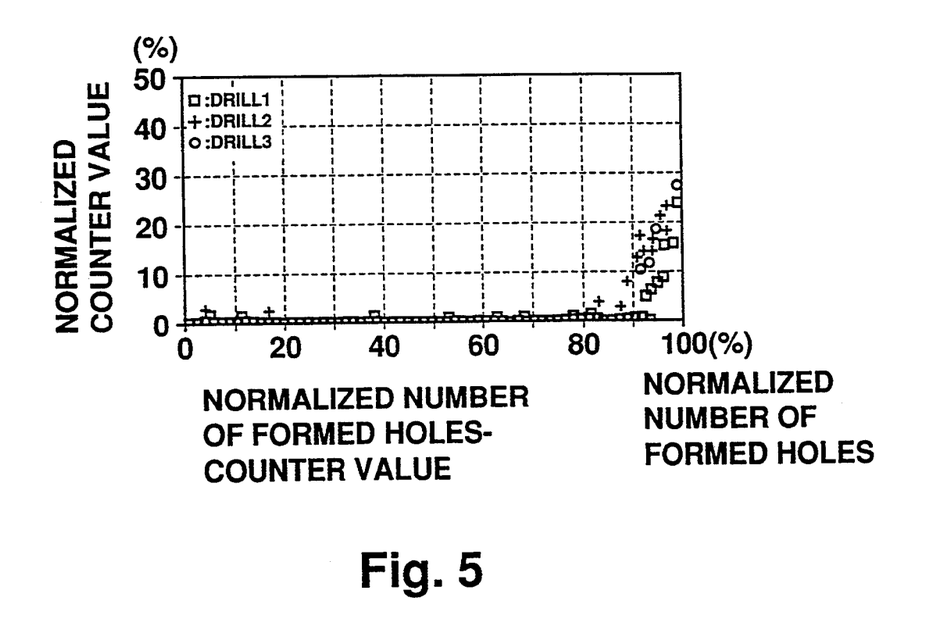
FIG. 5 shows a position at which a remarkable change of work load signals appears, when the number of formed holes is normalized.

FIG. 4 is a graph showing output signals of the normalizing section 109, and these signals are obtained by first measuring the work load values of drills shown in FIG. 9 by the use of a cutting dynamometer and then inputting the values to a work load monitoring section 21 shown in FIG. 1. With regard to the graph shown in FIG. 4, an ordinate axis denotes the counter values normalized in the normalizing section 109, and an abscissa axis denotes the number of holes formed by the drills. As can be understood from FIG. 3A and FIG. 4, the abnormal signals detected by the abnormal signal detecting section 106 increase after the breakage of the drills, but the number of the holes which will be further formed by the drills cannot be predicted only by the detection of the remarkable change of the work load values before the breakage of the drills. FIG. 5 is a graph obtained by using the number of the formed holes on the abscissa axis of the graph in FIG. 4 as a parameter representing the tool life and carrying out normalization under conditions that the number of the formed holes at the time of the breakage of each tool is regarded as 100%. Thus, as shown in FIG. 5, it can be understood that the remarkable change of the work load values appears in the vicinity of 90% by normalizing the number of the formed holes. Hence, it can be predicted that the normalized residual life of the drill is 10%. That is, it is predictable that there is a high possibility that the breakage of the drill will occur at a time when additional holes are formed in the number of as many as about 1/9 of the holes formed until the remarkable change of the work load values has been detected, after the detection of the remarkable change of the work load value.

Figure 6:
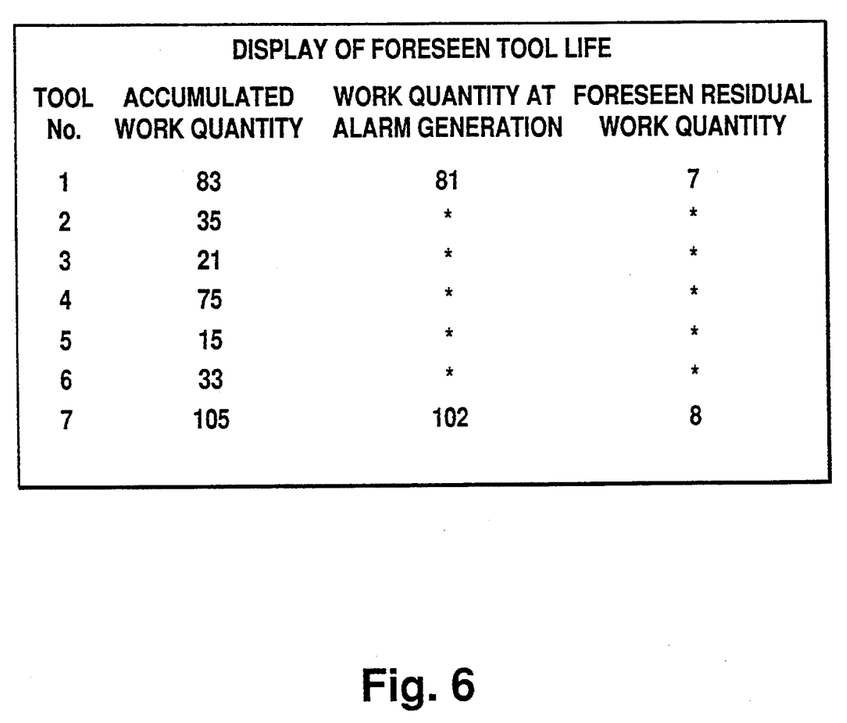
FIG. 6 shows a display example.

FIG. 6 shows a display example of data in the case that the present embodiment is utilized. In FIG. 6, an accumulated work quantity represents the number of holes formed till now. Furthermore, a predicted residual work quantity is output when the remarkable change of the work load values appears, and the number of this predicted residual work quantity will reduce one by one each time one hole is formed. As the work quantity at the time of the alarm generation, there can be supported an accumulated work quantity at the time when the remarkable change of the work load values appears. In this connection, the asterisk * in FIG. 6 is a symbol which means that the remarkable change of the work load values has not appeared yet.

In the above-mentioned embodiment, the number of the formed holes has been taken as the parameter representing the tool life, but needless to say, the number of worked articles or a working time of each tool can also be utilized as the parameter representing the tool life. In addition, as the means for measuring the work load values, the output of the cutting dynamometer has been used, but it is also possible to use a measured value of a main load current or a measured value of an AE signal, and In this case, the same functional effects as in the above-mentioned embodiment can be obtained.

As described above, according to the present invention, a parameter representing a tool life is accumulated by a work quantity accumulating section, and a remarkable change of work load values is detected by a work load monitoring section, whereby a residual tool life is calculated on the basis of a ratio of a normalized value of a life of the tool and the accumulated value of the parameter representing the tool life at a point of time when the remarkable change of the work load values appears, and the residual life is then reported. In consequence, an operator can suitably judge tool exchange timing, and automatic tool exchange can be achieved by reporting the timing to a control device, which can achieve laborsaving.

What is claimed is:

1. An apparatus for predicting a residual tool life of a tool attached to a machine tool which comprises:
   (a) a work quantity accumulating section for accumulating a parameter which represents expended tool life,
   (b) a work load monitoring section for detecting a significant change of work load values of the tool,
   (c) a predicted life setting section for storing a normalized residual tool life ratio for the tool at a point of time when the significant work load values change appears;
   (d) a predicted residual work quantity calculating section for calculating a residual tool life on the basis of the accumulated parameter representing expended tool life of the work quantity accumulating section and the normalized residual tool life ratio of the predicted life setting section, when the significant change of the work load values is detected in the work load monitoring section, and
   (e) a predicted residual work quantity outputting section for externally reporting the residual tool life calculated by the predicting residual work quantity calculating section.

2. The apparatus of claim 1, wherein the accumulating section accumulates the number of machining operations performed by the tool.

3. The apparatus of claim 1, wherein the accumulating section accumulates the number of holes made by the tool.

4. The apparatus of claim 1, wherein the accumulating section accumulates a period of time the tool has been in operation.

5. A work load monitor which comprises:
   (a) a memory section for storing a predetermined number of work load values of a tool as digital data,
   (b) an averaging processing section for calculating a mean value of the work load values,
   (c) a band width setting section for setting an allowable width of fluctuation of each of the work load values from the mean value calculated in the averaging processing section,
   (d) an abnormal signal detecting section for comparing a difference between the mean value calculated in the averaging processing section and each of the work load values with the allowable width set by the band width setting section, and then outputting abnormal signals when the difference is in excess of the allowable width,
   (e) a counter section for counting a number of the abnormal signals output,
   (f) a normalizing section for calculating a normalized ratio of the number of the abnormal signals output to the predetermined number of work load values, and externally outputting the normalized ratio, and
   (g) a comparing section for outputting an alarm so as to report a significant change of the work load values, when the normalized ratio is larger than a predetermined value.

6. The work load monitor of claim 2, further comprising:
   (h) a work quantity accumulating section for accumulating a parameter representing expended tool life,
   (i) a predicted life setting section for storing a normalized residual tool life ratio for the tool at a point of time when the significant work load values change appears,
   (j) a predicted residual work quantity calculating section for calculating a residual tool life on the basis of the accumulated parameter representing expended tool life of the work quantity accumulating section and the normalized residual tool life ratio of the predicted life setting section, when the significant change of the work load values is detected, and
   (k) an outputting section for outputting the residual tool life calculated by the predicting residual work quantity calculating section.

7. The work load monitor of claim 6, wherein the accumulating section accumulates a number of operations performed by the tool.

* * * * *

UNITED STATES PATENT AND TRADEMARK OFFICE
CERTIFICATE OF CORRECTION

PATENT NO. : 5,428,556
DATED : June 27, 1995
INVENTOR(S) : Yoshio TORIZAWA et al.

It is certified that error appears in the above-indentified patent and that said Letters Patent is hereby corrected as shown below:

On the title page:

Item [63], change "Feb. 25, 1993" to --May 25, 1993--.

Signed and Sealed this

Fifth Day of September, 1995

Attest:

BRUCE LEHMAN

Attesting Officer

Commissioner of Patents and Trademarks